Patented Sept. 12, 1944

2,358,266

UNITED STATES PATENT OFFICE 2,358,266

FRUIT COLORATION

David G. Ulrey, Lakeland, Fla., assignor to Gregg Maxcy, Sebring, Fla.

No Drawing. Application January 3, 1942, Serial No. 425,577

3 Claims. (Cl. 99—103)

My invention relates to the dyeing and coloring of food products, particularly fruits, and provides particular dyeing or coloring compositions and methods therefor.

Certain harvested food products, such as citrus fruits, including oranges, grapefruit, lemons and the like, as harvested, differ widely in color and quite frequently although entirely ripe and in excellent condition, do not present an attractive or uniform color. For the purpose of improving marketability of such fruit or other product, it is desirable to enhance or change the color of the fruit, as harvested, in order to present to the purchaser of the fruit a normal varietal color, and to have the fruit contained in a given shipment have a substantially uniform color. Thus, Valencia oranges may be harvested when fully ripe, presenting at that time a good orange color, but if kept in storage for a short time often assume a greenish tinge which materially decreases marketability. The coloring of oranges for this purpose, is generally called a "color add" process.

In accomplishing such coloring of fruit it is desirable that the dyes or colors employed should be harmless if eaten by the consumer; that the color shall be applied in such a manner as to attain a natural and uniform appearance, and that the application of the color may be accomplished with rugged and simple apparatus.

I have discovered that the dye 1-xylylazoxylylazo-2 naphthol, particularly when employed with a carrier of the sodium alkyl sulphate type, in water, attains these desired results, particularly as to oranges, and provides permanent uniform and natural coloring of the product, and is entirely harmless if eaten. While I prefer to use the dye mentioned, it is possible to use other dyes. The dye mentioned is usually considered to be an oil dye, not readily soluble in water, and it is by the action of the sodium alkyl sulphate type carrier, that it is possible to dissolve the mentioned dye in water. I apply the dye in a quantity of water at about 120° F.

An object of my invention is to provide a dye for coloring or dyeing oranges and other fruit which is light-proof, will not harm the consumer and will provide a bright attractive colorful product which may be readily produced, without impairing the characteristic texture of the fruit, and a method for applying such dye.

Another object of my invention is to provide a particular carrier or solvent that will greatly facilitate the solution of my dye in water and facilitate the application of the dye to the fruit.

Still another object of my invention is to provide a method for applying the dye or color to the fruit without removing the natural wax and oil from the peripheral cells of the skin, without blotching the applied color, and without applying any media to the fruit which are likely to become rancid during the process of application.

With the above and other objects in view which will more readily appear as the nature of the invention is better understood, the same consists in the novel dyes and agents and methods of their application, which I describe.

Various proposals have been made heretofore for imparting normal varietal color to citrus fruit which lacked such color. Heretofore it has been most usual in attempting to color citrus fruits to apply media which would extract the native oils and wax from the depths of the skin and would replace them by new coloring matter. The use of such agents inevitably dries out the skin and ultimately the fruit decays. Oil dyes have been dissolved in a volatile solvent such as kerosene. The attempt has also been made heretofore to use soaps and sulphonated fatty substances, which in the textile dyeing industry are used as mordants. The soaps need a further agent to assist in penetration of the skin of the fruit, and agents which have been used for this purpose are di-pentene, borax, carbonate of soda and tri-sodium phosphate, all of which agents will attack the oil cells of the skin of the fruit. In my Patent #2,133,064 I have described the application of a thin film of soap solution or thin film of dye solvent, and the subsequent dusting of the dry dye over the surface of the fruit. Comparatively high temperatures are needed for the application of these agents, which further results in the drying of the peel and partial destruction of the oil cells.

Both soap and the sulphonated fatty substances, whatever their nature, quickly become rancid in the color dye bath resulting in fruit decay. Both the soaps and the sulphonated substances will split or curd from the dye when juice from broken or decayed fruit enters the dye bath, which causes blotching and uneven coloring of the fruit. Heretofore in the industry when this occurred, it has been the practice to add some water conditioner, such as alkalies, to neutralize the acids thus introduced into the dye bath. This practice forms various salts, which causes further contamination of the fruit.

The dye and coloring medium which I provide avoids these various disadvantages which have been heretofore experienced.

With the use of soaps, whether potassium or sodium, as the carrier or solvent for the oil dye in the coloring of fruit, which soaps have alkali saponifier of the fatty material, the presence of free fruit juice causes separation of the soap into a partial saponification. The free fatty matter then present will hold and bind the oil dye, which no longer being water soluble, causes blotching and non-uniform coloring of the fruit.

Other types of carriers for the oil dye, heretofore used, consisted of the propyl, isopropyl, and isobutyl derivatives of naphthalene sulphonic acid and of sulphonates of tetrahydronaphthalene and octohydroanthracene. These types like the sulphonated oils, although they have good stability to hard water, lack detergent properties to cause the oil dye to penetrate the oily waxy water-repellent skin of the orange. By addition of penetrating solvents, the oil cells are attacked causing hardening of the peel.

I avoid the disadvantages mentioned of these agents which have been heretofore employed.

The dye which I prefer to employ is 1-xylylazoxylylazo-2 naphthol having the formula $C_{24}H_{13}N_{40}$ and being represented by the probable structural formula

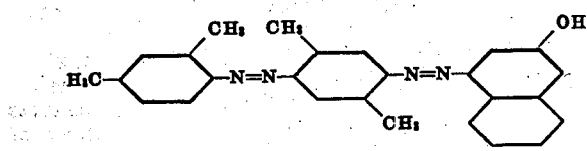

This particular dye or color presents a very attractive color when applied to the fruit, and enhances the natural varietal color, and is entirely harmless if eaten.

I often find it desirable to employ a dye mixture consisting of about 75% of 1-xylylazoxylylazo-2 naphthol and about 25% of the yellow dye known as Yellow OB, which is 1-o-tolylazo-2 naphthylamine, which mixture produces a satisfactory orange color.

Since this dye 1-xylylazoxylylazo-2 naphthol is usually considered to be an oil dye, it is not readily soluble in water of any temperature, but if to a quantity of water there is added a suitable amount of a suitable carrier, for which I prefer to use a carrier of the sodium alkyl sulphate type, the dye is readily taken up by the water. When the water carrying the dye and the carrier is applied to the peel of oranges or other citrus fruit, the fibres of the peel have a great affinity for the mentioned dye, which is absorbed into the fibres themselves, thus constituting a permanent coloring thereof. The dye has a greater affinity for the fibres than it does for the mixture of water and carrier wherein it is carried. I find that the oxylazo side chain on the dye I prefer, gives a deeper penetrating dye than the dyes heretofore employed for this purpose.

The grade of purity of the dye mentioned which is desirable for the present purpose, is represented by the specification, volatile matter (at 100° C.) not more than 2.0%, sulphated ash not more than 2.0%, water soluble matter not more than 0.5%, matter insoluble in carbon tetrachloride not more than 1.0%, chlorides and sulphates of sodium not more than 1.0%, amino-azo-xylene not more than 0.2%, pure dye 1-xylylazoxylylazo-2 naphthol (as determined by titration with titanium trichloride) not less than 95.0%.

It will be understood that the dye carrier of the present invention is of the sodium alkyl sulphate type and in particular is of the straight sodium salts chain which is inclusive, for example, of sodium alkyl sulfonate, which I employ as a preferred agent.

In applying my dye to the fruit I make up a stock solution by taking as a typical example:

| | Pounds |
|---|---|
| Dry oil color 1-xylylazoxylylazo-2 naphthol | 100 |
| Solvent for the dry color (sodium alkyl sulphate) | 25 |
| Water to complete 100 gallons. | |

The dry oil dye and the solvent are added together, the water is added, and all mixed together, heating for fifteen minutes at 200° F.

As a preferred stock solution I use a solution made up as follows:

| | Pounds |
|---|---|
| Dry oil color 1-xylylazoxylylazo-2 naphthol | 100 |
| Sodium alkyl sulphonate | 25 |
| Water to complete 100 gallons. | |

I have measured the surface tension of a liquid made by cutting the stock solution just mentioned containing sodium alkyl sulphonate, with thirty parts by volume of water, employing a du Nouy surface tension apparatus, and find the surface tension at 20° C. to be from about 46 to 34 dynes per centimeter. This shows complete dispersion of the dye.

The preferred stock solution made up as just described with my preferred dye and my carrier is a solution and presents a deep solid color. This is to be distinguished from the resultant obtained by adding my preferred dye to a representative soap solution, which I find to produce simply an emulsion, which is of decidedly inferior usefulness for coloring fruit.

The fruit after washing is submerged, sprayed, or dipped with suitable apparatus, in a color solution, made by mixing one part of the dye stock solution to about three hundred and fifty parts by volume of water. As hereinbefore indicated in the examples given, 100 gallons constitutes the stock solution basis and therefore it is to be understood that the ratio here given represents mixing one part of the dye stock solution (e. g. 100 gallons) to thirty-five parts of water (e. g. three hundred and fifty parts of water by volume).

This solution is then heated to 120°–125° F. and the fruit is exposed to same for from two to three minutes in the submerging type color unit, and from three to four minutes at 120° to 125° F. in the spray type unit.

The fruit is then washed, waxed, polished and graded as in the usual procedure.

The method which I have described may be practiced with apparatus which is in general use for handling, washing and treating citrus fruit, and does not require detailed description. Either a submersion type unit or a spray or flood type unit may be used, but I prefer the latter, wherein the color is heated in a tank and a centrifugal pump forces the color through the spray nozzles on the rolling fruit.

Modifications may be made within reasonable ranges of the particular quantities of the several ingredients set forth in the preferred composition above given with the attainment of comparable results.

The particular steps of the method which I have described for applying the dye to the fruit are especially adapted for the application of the preferred dye which I have described.

In actual practice I have found that the use of the particular dye and carrier which I have described, and their application in the particular manner which I have described, produce fruit of unusually attractive permanent light-fast coloration, of greatly enhanced marketability.

I claim:

1. A coloring compound for citrus fruit whose base consists of the oil-dye 1-xylylazoxylylazo-2 naphthol and the solvent sodium alkyl sulphate, in a water solution.

2. The method of preparing a fruit coloring compound which consists in the first step of admixing dry 1-xylylazoxylylazo-2 naphthol with sodium alkyl sulphate, then adding water to the mixture and heating the resultant solution at a temperature of approximately 200° F.

3. The method of coloring whole fruit without affecting the oil cells or causing decay thereof, which consists in subjecting the whole fruit to a solution of 1-xylylazoxylylazo-2 naphthol and sodium alkyl sulphate at a solution temperature ranging approximately between 120° and 125° F.

DAVID G. ULREY.